(12) United States Patent
Perret

(10) Patent No.: US 6,227,557 B1
(45) Date of Patent: May 8, 2001

(54) PROTECTIVE ROOF FOR BICYCLES OR THE LIKE

(75) Inventor: Andre Perret, Munich (DE)

(73) Assignee: Claus-Michael Mayr, Munich (DE)

( * ) Notice: Subject to any disclaimer, the term of this patent is extended or adjusted under 35 U.S.C. 154(b) by 0 days.

(21) Appl. No.: 09/194,951

(22) PCT Filed: Jun. 10, 1997

(86) PCT No.: PCT/EP97/03012

§ 371 Date: Dec. 7, 1998

§ 102(e) Date: Dec. 7, 1998

(87) PCT Pub. No.: WO97/47514

PCT Pub. Date: Dec. 18, 1997

(30) Foreign Application Priority Data

Jun. 14, 1996 (DE) ............................................. 196 23 849

(51) Int. Cl.⁷ ................. B62J 17/08; B62J 6/20
(52) U.S. Cl. ................. 280/288.4; 296/100.15; 296/210; 296/213; 135/88.01
(58) Field of Search ................... 296/213, 210, 296/100.15, 100.16, 107.02, 78.1; 280/288.4; 135/88

(56) References Cited

U.S. PATENT DOCUMENTS 4,045,077 * 8/1977 DeVone ................................. 296/78.1
4,560,196 * 12/1985 Carter, Sr. ............................. 296/102

FOREIGN PATENT DOCUMENTS

| 2947171 A1 | 5/1981 | (DE) . |
| 1116771 | 5/1956 | (FR) . |
| 1175543 | 3/1959 | (FR) . |
| 8-104276 * | 4/1996 | (JP) ..................................... 296/78.1 |

OTHER PUBLICATIONS

DE–GM 1710216; Mar. 11, 1952.
DE–GM 1712785; Sep. 27, 1955.
Patent Abstracts of Japan, Publication No. 08104276 A; Apr. 23, 1996.
PCT International Search Report.

* cited by examiner

*Primary Examiner*—D. Glenn Dayoan
*Assistant Examiner*—Greg Blankenship
(74) *Attorney, Agent, or Firm*—Perman & Green, LLP

(57) ABSTRACT

The invention relates to a protective roof (1) for bicycles comprising a frame (2) and a covering (3) impermeable to rainwater and/or UV-radiation. The frame (2) comprises an elastic tube (4) bent into the form of a spoon-shaped loop, the two tube ends (5a, 5b) being held in the region of the back wheel hub (6) and the end of the frame (2) being adjusted to a predetermined inclination and/or height via a tensioning cable (9) fixed in the region of the handlebar (8).

12 Claims, 1 Drawing Sheet

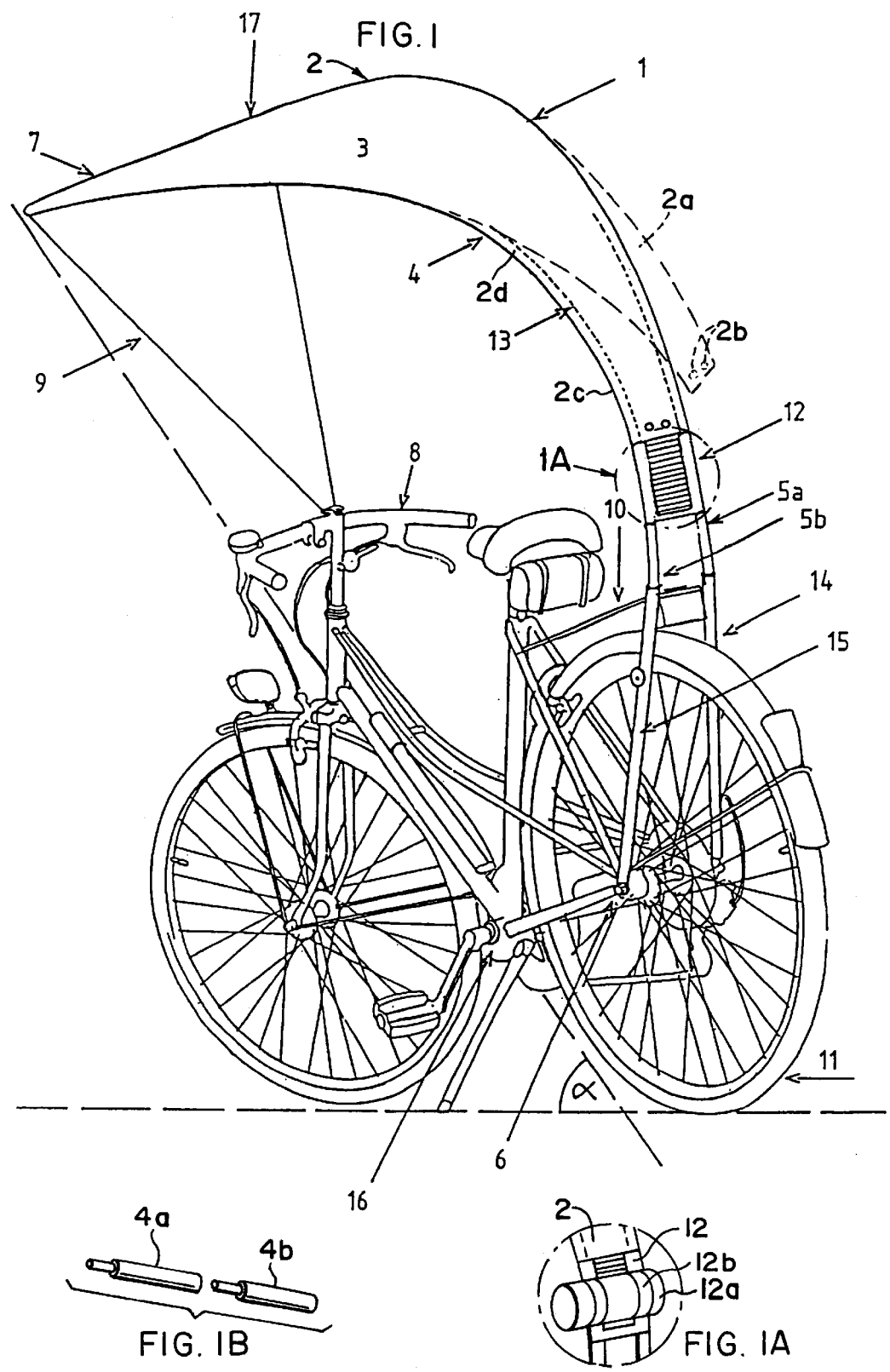

PROTECTIVE ROOF FOR BICYCLES OR THE LIKE

BACKGROUND OF THE INVENTION

The invention relates to a protective roof for bicycles or the like.

Protective devices for bicycles are known with the object of protecting the cyclist from rain. They are usually structures in the form of a tent fixed on the bicycle frame and surrounding the cyclist's body. An opening in the form of a hood is provided in the tent roof for the cyclist's head and leaves the cyclist's face substantially unprotected.

Devices of this kind are very bulky, increase the bicycle's air resistance by a multiple and obstruct the cyclist in many respects. For example, mounting the bicycle becomes a complicated procedure, as does also alighting and fitting and removing the protective device. Structures of this kind are also sensitive to side winds. Since the cyclist no longer has visible contact with the pedals and controls, such as brakes and gear shift, operation may be adversely affected. In addition, rear view is difficult, since the hood is usually rigidly sewn to the tent roof.

The increasing practice of cyclists to hold an umbrella with one hand during rain and steer with one hand should be stopped. Yet cycling in the rain should be possible provided the safety parameters are satisfied in order to reduce road traffic accidents.

The object of this invention is to provide a protective roof for bicycles or the like to provide effective protection from rain and solar irradiation, while constituting an aesthetically attractive solution with the simplest means.

This problem is solved by means of the claims.

The sub-claims characterise features of preferred embodiments of the protective roof according to the invention.

The idea underlying the present invention is to utilise the elasticity of a suitably selected tube in order to tension a very simple frame structure above the cyclist, the frame structure and the fabric covering being aesthetically restricted to the necessary minimum. The frame structure is completely open on both sides and forwardly, so that it in no way restricts the freedom of movement of the cyclist.

The protective roof covering extends predominantly horizontally, and in any case wherever the roof has a certain larger width, so that the air resistance is increased only insignificantly by the provision of the protective roof. Moreover, the roof tensioned above the cyclist's head increases the cyclist's visibility in road traffic, so that other road users, and particularly motorists, have their attention drawn in good time to the cyclist as a result of the signalling effect, so that the risk of accident is reduced by the protective roof according to the invention.

The invention will be explained in detail below with reference to the drawing and one exemplified embodiment.

BRIEF DESCRIPTION OF THE DRAWINGS

FIG. 1 is a perspective view of a bicycle with a protective roof according to the invention fitted thereto.

FIG. 1A is a partial perspective view of a stiffening clip of the bicycle protective roof in FIG. 1; and FIG. 1B is an exploded partial perspective view of a frame tube of the protective roof in FIG. 1.

DETAILED DESCRIPTION OF THE INVENTION

The drawing shows a parked bicycle together with the protective roof 1, which comprises basically a frame 2 consisting of an elastic tube 4 around the front part of which a textile or plastic covering 3 is fitted. In the example illustrated here, the frame consists of a long one-piece flexible plastic tube, the two ends 5a, 5b of which are held in a mounting 14 fixed on the bicycle frame near the back wheel hub 6.

The mountings used in the example illustrated comprises a pair of mounting tubes 18 with locking screws 15 by means of which the tube ends 5a, 5b of the frame of the protective roof 1 are locked. A reinforcing clip 12 is also provided above the bicycle back wheel and above the luggage rack 10 to bring the tube ends 5a, 5b of the frame 4 into a specific position. The reinforcing clip is about 30 cm tall and it spaces the tube ends apart by about 10 cm. As shown in FIG. 7A, the clip surface can preferably be utilised to accommodate for example, a bag 12a, and/or reflectors, or a rear light 12b, or the like.

The covering 3 may consist of a light plastic sheet or textile material, the edge of the covering having a hollow hem 13 through which the frame tube 4 is fitted. The elasticity of the plastic tube provides the tension required to stretch the covering open without folds in the protective roof. The covering of the protective roof may be in the form of an envelope with a closable opening 2d for the introduction of the frame tube therein. The envelope is closable using closing means 2b which include hook and loop fasteners, or buttons, or a sliding clasp fastener. A retaining cable 9 is provided at the end 7 of the roof and its other end is fixed on the handlebar 8. Fixing can be provided simply by a hook additionally provided in the middle of the handlebar, the cable being attached to the hook. It is also possible to provide a plurality of hooks or a plurality of loops in the cable so that the roof inclination in the front region thereof can be varied. Again, the elasticity inherent in the frame tube gives the protective roof viewed in profile an organic and striking shape which does away with the need for any supports or rigid mountings at the roof end. This gives the cyclist the maximum freedom of movement with the protective roof being practically imperceptible. In order that the cyclist can be kept substantially dry even when cycling at speed in the rain, it is advantageous to make the length of the tube 4 such that the straight line passing through the end 7 of the roof and through the bicycle wheel bearing 16 includes an angle $\alpha$ of between 45° and 60°, preferably 50°, with the horizontal. In this way the front edge of the roof does not project beyond the tip of the front wheel.

This ensures that raindrops dropping in front of the bicycle at speed practically do not come into contact with the cyclist.

Preferably, the protective roof consists mainly of plastic, and the same applies to the frame tubes and the corresponding mounting tubes 18 for the tube ends 5a, 5b on the cycle frame. This results in a lightweight construction, which is easy to handle and which can also be readily released from the bicycle. As shown in FIG. 1B, in order that the protective roof can be stored conveniently when not in use, it is advantageous to make the frame in a number of parts from interfitting tubes 4a, 4b (only two tubes are shown for example purposes) which together with the covering can be transported in a compact bag.

To increase the cyclist's safety by means of the protective roof according to the invention it can consist of highly reflective materials or materials which do not provide appreciable backscatter.

Advantageously, the protective roof has a width of 60 to 70 cm in the front area. The width of the protective roof decreases towards the rear end so that there is only a narrow tapering roof zone as far as the back end of the luggage rack 10 approximately behind the cyclist's shoulder zone or back, so that the air resistance of the cyclist and cycle unit is increased only slightly. This roof shape also has the advantage that in heavy rain a gutter forms substantially in the middle area of the covering, and the rainwater can flow off via this at the rear end of the roof.

The triangular cable configuration see FIG. 1 permits an undisturbed view forwards. At the same time, the rearward view is not appreciably blocked by the narrow back part, and the same applies for other road users.

The protective roof according to the invention has no adverse effect on important functions of the cycle, so that the luggage rack 10 can still be used without difficulty, for example. Steering is not affected by the fixing of the tensioning cable 9, since the retention point is situated substantially on the axis of rotation of the handlebar.

Also, the protective roof according to the invention is extremely adaptable and can be adjusted to any type of bicycle.

The above description of one exemplified embodiment has no limiting force but is intended solely for illustrative purposes. The invention covers all the variant embodiments within the scope of the claims.

What is claimed is:

1. A bicycle protective roof (1) comprising: a frame (2) and a covering (3) impermeable to rainwater and/or UV radiation, wherein the frame (2) comprises an elastic tube (4) which is bent into the form of a spoon-shaped loop having two tube ends (5a, 5b) being adapted to be mounted to a bicycle in a region of a back wheel hub (6), and an end of the frame (2) being adjusted to a predetermined inclination and/or height by means of a tensioning cable (9) which is adapted to be fixed near a handlebar (8) of the bicycle.

2. A protective roof according to claim 1, further comprising a mounting (14) connected to the tube ends for counting the tube ends (5a, 5b) to the bicycle and for guiding the tube ends towards a rear end of a luggage rack (10), and a stiffening clip (12) disposed on the frame so that when the frame is mounted to the bicycle, the stiffening clip is located above a back wheel (11) of the bicycle, the clip connecting the two tubes (5a, 5b) together rigidly.

3. A protective roof according to claim 1, characterised in that the covering (3) is made of plastic or textile, and comprises a continuous hollow hem (13) through which the tube (4) passes, the tube tautening the covering by its elasticity.

4. A protective roof according to claim 1, characterised in that a mounting (14) comprises mounting tubes (18) capable of being fixed on a bicycle frame, on which mounting tubes locking screws (15) are disposed to lock the frame tube ends to the mounting tubes.

5. An assembly comprising a bicycle, and a protective roof according to claim 1, the protective roof being mounted on the bicycle such that a straight line passing through a front end edge (7) of the frame (2) and a pedal bearing (16) of the bicycle includes an angle ($\alpha$) of about 45° to 60° with the horizontal.

6. A protective roof according to claim 1, characterised in that the height of a front roof zone (17) of the covering is adjustable by varying the length of the attached tensioning cable (9).

7. A protective roof according to claim 1, characterised in that the elastic tube (4), the covering (3), and the tensioning cable (9) are plastic.

8. A protective roof according to claim 6, characterised in that the roof has a maximum width of between 60 and 70 cm in the front zone.

9. A protective roof according to claim 1, characterised in that the covering extends rearwardly to a distance such that the water raining onto the roof is discharged with guidance as far as a back end of the roof.

10. A protective roof according to claim 1, characterised in that the frame (2) and/or the covering (3) are made from material having a highly light-scattering and/or reflecting effect.

11. A protective roof according to claim 2, characterised in that the stiffening clip (12) comprises reflectors, a back light, or a bag.

12. A protective roof according to claim 1, characterised in that the elastic tube (4) comprises a plurality of tube parts adapted to be fitted together.

* * * * *

UNITED STATES PATENT AND TRADEMARK OFFICE
CERTIFICATE OF CORRECTION

PATENT NO. : 6,227,557 B1
DATED : May 8, 2001
INVENTOR(S) : Perret

It is certified that error appears in the above-identified patent and that said Letters Patent is hereby corrected as shown below:

<u>Column 4, claim 6,</u>
Line 20, delete "the length" and replace with -- a length --.

Signed and Sealed this

Sixteenth Day of April, 2002

Attest:

JAMES E. ROGAN
*Attesting Officer*     *Director of the United States Patent and Trademark Office*